(12) United States Patent
Larmo et al.

(10) Patent No.: US 8,345,649 B2
(45) Date of Patent: Jan. 1, 2013

(54) METHOD FOR INDICATION OF CONSECUTIVE DATA UNITS IN A RAN

(75) Inventors: Anna Larmo, Espoo (FI); Janne Piesa, Espoo (FI); Mats Sågfors, Krykslätt (FI); Per Johan Torsner, Masaby (FI); Stefan Wager, Espoo (FI)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 494 days.

(21) Appl. No.: 12/520,384

(22) PCT Filed: Oct. 31, 2007

(86) PCT No.: PCT/SE2007/050804
§ 371 (c)(1),
(2), (4) Date: Aug. 27, 2009

(87) PCT Pub. No.: WO2008/079081
PCT Pub. Date: Jul. 3, 2008

(65) Prior Publication Data
US 2010/0074178 A1    Mar. 25, 2010

(30) Foreign Application Priority Data

Dec. 22, 2006  (SE) ...................................... 0602798

(51) Int. Cl.
*H04W 4/00* (2009.01)
*H04L 12/28* (2006.01)
*H04L 12/56* (2006.01)
*H04J 3/24* (2006.01)

(52) U.S. Cl. .......................... 370/338; 370/394; 370/474
(58) Field of Classification Search ........................ None
See application file for complete search history.

(56) References Cited

U.S. PATENT DOCUMENTS 7,054,633 B2    5/2006    Seo et al.
(Continued)

FOREIGN PATENT DOCUMENTS

JP    2003298509 A    10/2003
(Continued)

OTHER PUBLICATIONS

3rd Generation Partnershp Project. "3GPP TS 25.321 V7.2.0 (Sep. 2006)." 3rd Generation Partnership Project; Technical Specification Group Radio Access Network; Medium Access Control (MAC) protocol specification (Release 7), Sep. 2006.

(Continued)

*Primary Examiner* — Andrew Chriss
(74) *Attorney, Agent, or Firm* — Coats & Bennett, P.L.L.C.

(57) ABSTRACT

An object of the present invention is to provide a mechanism for improving the performance of a radio access network. The object is achieved by a data packet (200) in a first network node (110). The first network node (110) is adapted to transmit the data packet (200) to a second network node (120), over a radio link (130). The first network node (110) and second network node (120) are comprised in a wireless communications network (100). The data packet (200) comprising a data packet header (210) and a data packet payload (220). The data packet header (210) comprising at least one length indicator (211, 212, 213, 214, 215). The data packet payload (220) comprising a number of consecutive packet data units (221, 222, 223), of the same specific size. The number of consecutive data units (221, 222, 223), of the same size is indicated in the data packet header (210) using a first length indicator of the at least one length indicators (211, 212, 213, 214, 215).

19 Claims, 3 Drawing Sheets

| Length indicator value | Meaning |
|---|---|
| 1 | 1 octet packet data unit |
| 2 | 2 octet packet data unit |
| 3 | 3 octet packet data unit |
| ... | ... |
| N | N octet packet data unit |
| Reserved value 1 (larger than N) | 2 consecutive packet data units have the size N |
| Reserved value 2 (larger than N) | 3 consecutive packet data units have the size N |
| ... | ... |
| Reserved value m (larger than N) | m+1 consecutive packet data units have the size N |
| Reserved value m+1 (larger than N) | 2 consecutive packet data units have the same size as indicated by the previous length indicator |
| Reserved value m+2 (larger than N) | 3 consecutive packet data units have the same size as indicated by the previous length indicator |
| ... | ... |
| Reserved value m+k (larger than N) | k+1 consecutive packet data units have the same size as indicated by the previous length indicator |

U.S. PATENT DOCUMENTS

2004/0120348 A1* 6/2004 Chang et al. ............... 370/474
2004/0208160 A1* 10/2004 Petrovic et al. ............ 370/350
2005/0185608 A1* 8/2005 Lee et al. .................. 370/328
2006/0045032 A1 3/2006 Hamada

FOREIGN PATENT DOCUMENTS

| | | |
|---|---|---|
| JP | 2005237013 A | 9/2005 |
| JP | 2006067099 A | 3/2006 |
| WO | 2006/067570 A1 | 6/2006 |

OTHER PUBLICATIONS

Samsung, MACe- and MACes-PDU Structure & E-TFI table definition, 3GPP TSG RAN2#45, Yokohama, Japan, Nov. 15-19, 2004, R2-042382.

* cited by examiner

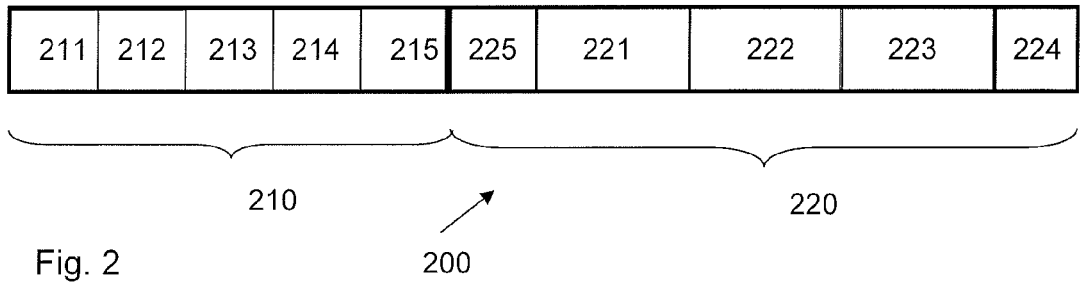

Fig. 2

| Length indicator value | Meaning |
|---|---|
| 1 | 1 octet packet data unit |
| 2 | 2 octet packet data unit |
| 3 | 3 octet packet data unit |
| ... | ... |
| N | N octet packet data unit |
| Reserved value 1 (larger than N) | 2 consecutive packet data units have the size N |
| Reserved value 2 (larger than N) | 3 consecutive packet data units have the size N |
| ... | ... |
| Reserved value m (larger than N) | m+1 consecutive packet data units have the size N |
| Reserved value m+1 (larger than N) | 2 consecutive packet data units have the same size as indicated by the previous length indicator |
| Reserved value m+2 (larger than N) | 3 consecutive packet data units have the same size as indicated by the previous length indicator |
| ... | ... |
| Reserved value m+k (larger than N) | k+1 consecutive packet data units have the same size as indicated by the previous length indicator |

Fig. 3

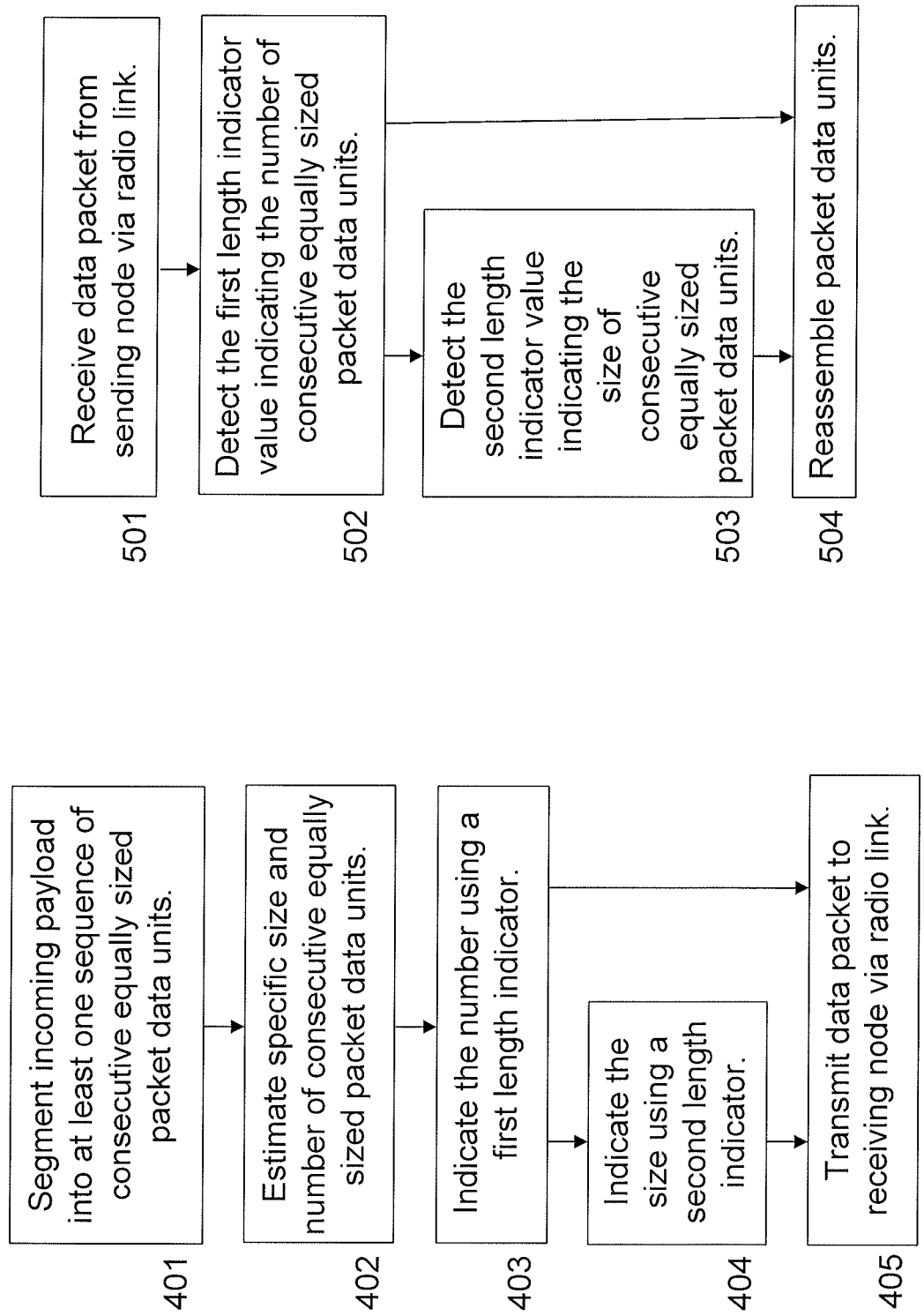

METHOD FOR INDICATION OF CONSECUTIVE DATA UNITS IN A RAN

TECHNICAL FIELD

The present invention relates to a method and an arrangement and a data packet in a first network node in a wireless communications network, and a method and an arrangement in a second network node in a wireless communications network. In particular the present invention relates to information overhead optimizing.

BACKGROUND

Wireless communications networks, such as the Third generation, 3G, wireless communications networks are wide area cellular telephone networks providing information services to end users via end user equipments. The information services may be e.g. text messaging, high-speed Internet access, video telephony and telephony. A user equipment can be e.g. a hand-held telephone, a card in a laptop computer, a personal digital assistant (PDA) and the like. The user equipment is varyingly known as a UE, a terminal equipment, a mobile station (MS), etc., depending on the standard.

A wireless communications network comprises a Core Network (CN) and several Radio Access Networks (RAN). RAN implements radio access technology allowing connectivity between user equipments and the CN via a base station such as e.g. a Node-B. The connection, i.e. the transmission path, between the user equipment and base station is called an up-link whereas the transmission path between the base station and the user equipment is called a down-link. The up-link and the down-link constitute the radio link. RAN further comprises Radio Network Controllers (RNC) providing control functionalities for one or more base stations. The RNC and its corresponding radio base stations are called the Radio Network Subsystem (RNS). There can be more than one RNS present in an RAN. Conceptually, it is situated between the user equipment and the CN. The main functions of the CN is to provide switching, routing and transmission of user traffic. CN further enables charging and network management functions.

Some of the communication protocols used in the RAN are the Medium Access Control (MAC) protocol and the Radio Link control (RLC) protocol. MAC and RLC are two protocols that, among other protocols, are included in the High Speed Packet Access (HSPA) collection of protocols for 3G wireless communications.

The wireless communications network of today offers a wide range of information services to the end users. The information services may be, as mentioned above e.g. text messaging, high-speed internet access, video telephony and telephony. The different services contains varying amounts of information, that is to say require different amounts of bandwidth when transmitted. Text messaging, such as Short Message Service (SMS) require only a small amount of bandwidth when transmitted whereas video telephony on the other hand require a considerable larger amount of bandwidth, to handle and synchronize both sound and vision. Typically, the radio link is the weak point of the transmission, providing the smallest amount of bandwidth. To get an as fast and effective transmission of information as possible, it is required that the data packets shall include as large part as possible of payload, and as small part as possible of overhead. Prior to the transmission over the radio link, the packets are segmented. Segmentation means that the incoming payload is divided into packet data units, of predefined and fixed sizes, these packet data units constituting the payload of the data packet to be sent. I.e. if the incoming payload is larger than the upper size limit of the data packet payload the incoming payload is divided into packet data units smaller or equal to the upper size limit.

However, the communication conditions influencing the bandwidth of the radio interface, i.e. the radio conditions, are not static. The radio conditions vary according to several aspects such as e.g. geographical surroundings, weather and number of simultaneous user equipments in the same radio cell and their service utilization. In order to comply with the requirements mentioned above of an effective transmission, a best effort approach is used. One way of compensating for poor radio conditions is to adapt segmentation in the sending node, i.e. reducing the maximum size of the packet data units when segmenting the incoming payload. This means that when the radio conditions are good, the sending node may transmit larger packet data units to the receiving node implying fast information transmission. However, if the radio conditions are bad, smaller packet data units requires to be transmitted, since trying to transmit too large packet data units may lead to poor communication efficiency such as unnecessary delays or even to lost information. The delays can e.g. be caused by excessive number of retransmissions whereas a cause, among others, of the lost information may be retransmission problems.

A disadvantage of having fixed and preconfigured packet data unit sizes is that there are too few/not enough of alternatives for packet data unit sizes to choose from when radio conditions are bad and segmentation of incoming payload is required. Either the packet data unit size is chosen too small which results in a slow information transmission caused by the large overhead of the data packets. On the other hand, trying to transmit too large packet data units, may lead to poor communication efficiency such as unnecessary delays or even to lost information. The delays can e.g. be caused by excessive number of retransmissions, such as e.g. HARQ (Hybrid Automatic Repeat request). HARQ is a functionality which, when the receiving node detects an erroneous packet data unit, sends a Negative Acknowledgement (NACK), to the sending node. The sending node responds, by retransmitting the requested packet data unit, to the receiving node. The HARQ process is repeated until either the packet data unit is successfully received by the receiver, or, a HARQ timer runs out. A cause, among others, of the lost information mentioned above, may be retransmission failure, such as e.g. HARQ failure. HARQ failure originates when the HARQ retransmission function fails, such as e.g. when the receiving node detects an erroneous packet data unit, sends a NACK to the sending node, but the sending node erroneously detects a positive Acknowledgement (ACK), and thus does not retransmit the requested packet data unit.

SUMMARY

It is therefore an object of the present invention to provide a mechanism for improving the performance of a radio access network by optimizing the packet header overhead.

The basic principle of solving the problem in a wireless communications network is to use predefined length indicator values of the data packet header indicating the number of consecutive equally sized packet data units in the data packet payload.

According to a first aspect of the present invention, the object is achieved by a data packet in a first network node. The first network node is adapted to transmit the data packet to a second network node, over a radio link. The first network node and second network node are comprised in a wireless communications network. The data packet comprises a data packet header and a data packet payload. The data packet header comprises at least one length indicator. The data packet payload comprises a number of consecutive packet data units, being of the same specific size. The number of consecutive packet data units, of the same size is indicated in the data packet header. A first length indicator of the at least one length indicators in the data packet header is used to indicate the number of consecutive data units.

According to a second aspect of the invention, the object is achieved by a method in a first network node for transmission of a data packet to a second network node over a radio link. The first network node and second network node are comprised in a wireless communications network. The data packet comprises a data packet header and a data packet payload. The data packet header comprises at least one length indicator. The data packet payload comprises a number of consecutive packet data units being of the same specific size. The number of consecutive data units is indicated using a first length indicator of the at least one length indicator in the data packet header. The data packet is transmitted to the second network node.

According to a third aspect of the invention, the object is achieved by a method in a second network node for reception of a data packet from a first network node over a radio link. The first network node and second network node are comprised in a wireless communications network. The data packet comprises a data packet header and a data packet payload. The data packet header comprises at least one length indicator. The data packet payload comprises a number of consecutive packet data units being of the same specific size. The second node receives the data packet from the first network node. The second node detects a first length indicator of the at least one length indicators in the data packet header. The first length indicator which indicates the number of consecutive data units. The second node reassembles the data units using the first length indicator of the at least one length indicators in the data packet header.

According to a fourth aspect of the invention, the object is achieved by an arrangement in a first network node. The first network node is adapted to transmit a data packet to a second network node over a radio link. The first network node and second network node are comprised in a wireless communications network. The data packet comprises a data packet header and a data packet payload. The data packet header comprises at least one length indicator. The data packet payload comprises a number of consecutive packet data units, being of the same specific size. The first network node arrangement comprises an indication unit adapted to indicate the number of consecutive data units of the same size using a first length indicator of the at least one length indicators in the data packet header. The first network node arrangement further comprises a transmitting unit adapted to transmit the data packet to the second node.

According to a fifth aspect of the invention, the object is achieved by an arrangement in a second network node. The second network node is adapted to receive a data packet from a first network node over a radio link. The first network node and second network node are comprised in a wireless communications network. The data packet comprises a data packet header and a data packet payload. The data packet header comprises at least one length indicator. The data packet payload comprises a number of consecutive packet data units, being of the same specific size. The second network node arrangement comprises a receiving unit. The receiving unit is adapted to receive the data packet from the first network node. The second network node arrangement comprises a detection unit adapted to detect a first length indicator of the at least one length indicators in the data packet header. The first length indicator of the at least one length indicators indicates the number of consecutive data units. The second network node arrangement comprises a reassembling unit. The reassembling unit is adapted to reassemble the data units using the first length indicator of the at least one length indicators in the data packet header.

An advantage with the present invention is that the performance of a radio access network is improved by optimizing the packet header overhead which leads to increased capacity.

A further advantage of the present invention is that the optimized packet header overhead enables enhanced compensation for poor radio conditions and thus a more robust wireless communications system.

BRIEF DESCRIPTION OF THE DRAWINGS

FIG. 2 is a schematic block diagram illustrating some embodiments of a data packet.

FIG. 3 is a table depicting length indicator values of some of the embodiments.

FIG. 4 is a flow chart illustrating method steps of some embodiments performed in a first network node.

FIG. 5 is a flow chart illustrating method steps of some embodiments performed in a second network node.

DETAILED DESCRIPTION

The solution is defined as methods and arrangements which may be put into practice in the embodiments below.

Figure 1:
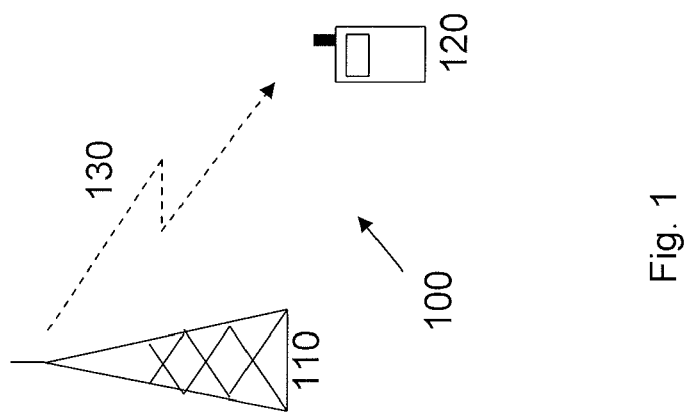
FIG. 1 is a schematic block diagram illustrating some embodiments of a wireless communications network.

FIG. 1 presents a wireless communications network 100 comprising a first network node 110 (first node 110) and a second network node 120 (second node 120). The wireless communications network 100 uses technologies such as e.g. Wideband Code Division Multiple Access (W-CDMA), High-Speed Packet Access (HSPA), Enhanced UMTS Terrestrial Radio Access (E-UTRA) (Universal Mobile Telecommunications System (UMTS)), 3G Long Term Evolution (3GLTE), Wireless World Initiative New Radio (WINNER), Wireless Local Area Network (W-LAN), Global System for Mobile Communications (GSM), Personal Communications Service (PCS) or D-AMPS, which stands for Digital Advanced Mobile Phone Service (D-AMPS).

The first node 110 is adapted to be connected to the second network node 120 over a radio link 130. The first node 110 is adapted to transmit information in the form of data packets to the second node 120 over the radio link 130. The first node 110 applies segmentation for information to be sent to the second node 120 over the radio link 130. The first node 110 may be e.g. a Base Transceiver Station (BTS), a Radio Base Station (RBS) or a Node-B or any other suitable node able to communicate over a radio link.

The second network node 120 is adapted to be connected to the first network node 110 over the radio link 130. The second node 120 is further adapted to receive information in the form of data packets from the first node 110 over the radio link 130. The second node 120 is also adapted to reassemble the information received from the first node 110. The second node 120 may be a portable communication device such as e.g. a Mobile Station (MS), a User Equipment (UE), a personal digital assistant (PDA), a laptop computer, a wireless telephone or any kind of devices capable of communicating via radio link.

When the first node 110 communicates with the second node 120 over the radio link 130 the information is transmitted in data packets. Such a data packet 200 is illustrated in FIG. 2. Examples of such data packets are found in the protocols of Medium Access Control (MAC), Radio Link Control (RLC) or Packet Data Convergence Protocol (PDCP). The data packet 200 comprises a data packet header 210 and a data packet payload 220. The data packet header 210 of the data packet 200 comprises several parameter fields that are used for e.g. addressing and control functions. FIG. 2 presents the example of a packet header comprising five such parameter fields 211, 212, 213, 214, 215. The data packet payload 220 comprises one or more data units, such as e.g. Radio Link Control Packet Data Units (RLC PDU), MAC Packet Data Units for the Dedicated transport channel (MAC-d PDU). In the example of FIG. 2, five data units 221, 222, 223, 224, 225 are shown.

In some embodiments, the sizes of the packet data units 221, 222, 223, 224, 225 are flexible and adapted according to e.g. radio conditions to enhance communication efficiency. The packet data unit sizes have an upper size limit, which is flexible. This provides a wider range of packet data unit upper sizes to use when adapting segmentation to the current radio conditions, such as e.g. when radio conditions are bad the upper size is small and when radio conditions are good the upper size is large. In some embodiments, the upper size limit of the flexible packet data unit is static. Using a static upper size limit i.e. a fixed upper size, for the flexible packet data unit is easier to implement, as no adaptation to radio conditions is needed. However, in case of the static upper size limit, then the upper size limit requires to be set rather conservatively, i.e. the packet size can not be too large to avoid poor efficiency at the cell edge. Poor efficiency at the cell edges may occur when trying to transmit a large incoming payload which is segmented into many packet data units to match the transport format selected. If one of the packet data units is lost, due to problems such as e.g. HARQ failure, then all packet data units originating from the same incoming payload will need to be retransmitted e.g. through RLC retransmission.

In one exemplary scenario, the first node 110 has received information data from the core network that is to be transferred over the radio link 130 to the second node 120. In this example, the payload of the received information data is so large that segmentation is required. Therefore, a segmentation of the incoming packets into several consecutive equally sized packet data units, 221, 222, 223, will be performed by the first node 110 prior to sending the packet 200 to the second node 120 over the radio link 130. In some embodiments, the size of the consecutive equally sized packet data units 221, 222, 223 may be the upper size limit. This is preferable since the packet header 210 overhead is minimized enabling an efficient communication. However, referring to FIG. 2, when the incoming payload is large, it may be likely that the segmentation results in a packet payload 220, comprising not only the sequence of consecutive equally sized packet data units 221, 222, 223, e.g. of the upper size limit size, but also in a following packet data unit 224, of a smaller size. This is due to the fact that the total size of the incoming payload to be segmented is not evenly dividable by the size of the sequence of consecutive equally sized packet data units 221, 222, 223. Thus the size of the one packet data unit 224, of a smaller size, equals the remainder of the division between the size of the incoming payload and the size of the consecutive equally sized packet data units 221, 222, 223. The size of the packet data unit 224 is always different, such as e.g. smaller, than the specific size of the consecutive equally sized packet data units 221, 222, 223. In some cases the size of the packet data unit 224 may be zero, meaning that there is no such following packet data unit of a smaller size. Further referring to FIG. 2, the sequence of consecutive equally sized packet data units 221, 222, 223 may be preceded by at least one packet data unit 225 of other sizes than the specific size of the consecutive equally sized packed data units 221, 222, 223. This is due to the fact that the at least one packet data unit 225 may be from another logical channel, where a different maximum size is used. Since the sizes of the packet data units 221, 222, 223, 224, 225 are variable and thus are unknown to the receiving second node 120, it is required that the second node 120 in some way is notified of the specific size of the consecutive equally sized packet data units 221, 222, 223 and, if present, the sizes of the following and/or preceding packet data units 224, 225 of a other sizes, being used. Moreover, since the number of consecutive equally sized packet data units 221, 222, 223 also is unknown to the second node 120, is it also required that the second node 120 is notified of the number of consecutive equally sized packet data units 221, 222, 223.

In some embodiments of the proposed solution, the first node 110 may regard the number of consecutive equally sized packet data units 221, 222, 223 and the specific size as control information, and accordingly the first node 110 may notify the second node 120 of the specific size and number, as described above, using some of the packet header parameter fields 211, 212, 213, 214, 215. Thus, in some embodiments of the proposed solution, the first node 110 uses the length indicator parameter field of the packet header 210 indicating both the number of consecutive equally sized data packet units 221, 222, 223 in the payload 220, as well as their specific size.

The length indicators indicate the length, most likely in octets, of the packet data unit. One of the most commonly used protocols for information transmission in wireless communications networks is Internet Protocol (IP). Since a typical maximum packet size of IP packets is 1500 octets, when that is the case, the length indicator indicates a value of at least 1500 octets implying that each length indicator requires being in the order of 11 bits long, enabling indication of 2048 values. Potentially, the length indicator may require being even longer to accommodate for even larger IP packets in the future. However, with such an 11 bit length indicator indicating 2048 values, as mentioned above, and the current 1500 octet IP packet maximum size, more than 500 "spare values" exist, i.e. in this case there are more than 500 values that currently are not used. Consequently, these spare values are free, and may be used for special purposes.

According to the present solution, the spare values of the length indicator may be reused as specific reserved values of the length indicator to optimize the packet header overhead in the case where several consecutive packet data units 221, 222, 223 in a packet payload 220 have the same size. Further according to the present solution, the spare values of length indicator are used to indicate the number of consecutive data packet units of the same size, as well as their specific size. FIG. 3 illustrates such an exemplary use of the spare length indicator values, as described above, when optimizing the use of length indicators in a table, i.e. reserving the previously unused length indicator values for specific uses.

The table in FIG. 3 includes several possible embodiments of the solution. In FIG. 3, the length indicator values 1 to N are used to indicate the specific size, in octets, of packet data units. In the exemplary scenario of IP packets as incoming payload, as previously mentioned, the 1 to N length indicator value range may be 1-1500, in order to enable size indication of all possible packet data unit sizes including the 1500 octet IP packet maximum size.

Further according to the present solution, the previously unused length indicator values may be used in the following way, as shown by the table in FIG. 3. A first length indicator value range of Reserved Values (RV), i.e. a first set of specific reserved values RV, corresponds to the value k indicating that k+1 consecutive packet data units of the packet payload 220 have the same size, which size is being indicated by another length indicator, such as e.g. a previous length indicator. The first set of specific reserved values RV of the length indicator may be chosen (reserved value m+1, where m is larger than N) to (reserved value m+k). In the exemplary scenario of IP packets as incoming payload, as mentioned above, the first set of specific reserved values RV may e.g. be chosen 1800-2048, to ensure that the first set of specific reserved values RV is larger than the N of 1500 as chosen above.

Yet further according to the present solution, the previously unused length indicator values may be used in the following way, as shown by the table in FIG. 3. A second length indicator value range of Reserved Values (RVm) may correspond to the value m, i.e. a second set of specific reserved values RVm, indicating that m+1 consecutive packet data units of the packet payload 220 have the same size N. The size N may equal the upper size limit. The second set of specific reserved values RVm may e.g. be chosen as (reserved value 1, which is larger than N) to (reserved value m). In the exemplary scenario of IP packets as incoming payload, as mentioned above, the second set of specific reserved values RVm may e.g. be chosen 1501-1799, to ensure that the value range is larger than the N of 1500 as chosen above.

Note that this is only examples of how the first set of specific reserved values RV or the second set of reserved values RVm of the length indicator may be chosen. It is also possible to choose them according to the following: The first set of specific reserved values RV and/or the second set of specific reserved values RVm are created from unused spare values of the length indicator. The first set of specific reserved values RV or the second set of reserved values RVm of the length indicator is chosen from a first value being represented by reserved value 1, which first value is larger than N, up to the final value being represented by a reserved value m. The first set of specific reserved values RV or the second set of reserved values RVm of the length indicator is chosen from a first value being represented by reserved value m+1, where m is larger than N, up to the final value being represented by a reserved value m+k.

FIG. 4 presents the method steps, performed by a first node 110, for transmission of information in data packets 200 to a second node 120 over a radio link 130 according to a first alternative of some of the embodiments. Even though, the method description below refers to embodiments where the first node 110 transmits the information, and the second node 120 receives the information, the method may also be equally applicable for the embodiments where the second node 120 transmits the information, and the first node 110 receives the information, meaning that the second node 120 may be adapted to perform all the steps performed by the first node 110 as described below, and vice versa. The first network node 110 may be a base station or the first network node 110 may be a portable communication device.

401. When communicating according to a first alternative of some of the embodiments, the first node 110, performs segmentation of the incoming information intended for the second node 120 resulting in a packet payload 220, comprising at least one sequence of consecutive equally sized packet data units 221, 222, 222, of a specific same size. The specific size of each of the consecutive equally sized packet data units 221, 222, 223 may be, but it is not restricted to be, the upper size limit N. Further, the packet payload may also comprise at least one preceding packet data unit 225 and/or at least one following packet data unit 224 of other sizes than the specific size of the consecutive equally sized packed data units 221, 222, 223.

402. The first node 110 estimates the number of the consecutive equally sized packet data units 221, 222, 223 of the packet payload 220 and estimates their specific size.

403. The first node 110 indicates the number of consecutive equally sized packet data units 221, 222, 223 in the packet payload 220 using a first length indicator parameter field of the packet header 210. According to some embodiments the first length indicator may be set to a first set of specific reserved values, here denoted RV, which indicates the number of consecutive equally sized packet data units 221, 222, 223 in the packet payload 220. In the scenarios wherein there may be no preceding packet data unit 225 of other size than the specific size in the packet payload 220, then the first length indicator may be the first length indicator parameter field 211 of the packet header 210. On the other hand, in the scenarios wherein there may be at least one preceding packet data unit 225 of other size than the specific size in the packet payload 220, the first length indicator may not be the first length indicator 211 of the packet header 210, since at least one preceding length indicator may be required referring to the at least one preceding packet data unit 225.

According to some embodiments of the present solution, applicable to the frequent case where the packet payload 220 comprises at least one sequence of consecutive equally sized packet data units 221, 222, 223 of the maximum size N, the first length indicator may be set to a second set of Reserved Values of length indicator values, here denoted RVm, indicating both the number of the consecutive equally sized data packet units 221, 222, 223 and their specific size, which in this case may be the maximum size N. In this case only one length indicator parameter field of the packet header 210 may be required, as opposed to two length indicator parameter fields for the general case of arbitrary sized packet data units as described above. This alternative however may require that the maximum size N is known in the first node 110 and in the second receiving node 120, which may not be required in the embodiments described above. Thus the maximum size N may be configured for the receiving second node 120 via higher layer signaling, such as e.g. Radio Resource Control (RRC) signaling. (RRC is a concept and a protocol name for a set of control messages exchanged between user equipment (UE) and the Radio Network Controller (RNC) in the UMTS standard). According to these embodiments where specific size is known by the second node 120, the packet overhead, i.e. the size of the packet data header 210, may be reduced as only one length indicator parameter field may be required to point out the sequences of equally sized packet data units. However these embodiments may only be applicable if the maximum size N remains constant. The embodiments according to above may require two length indicator parameter fields, but may also be used when the maximum size N is dynamically changed.

404. According to some embodiments, the first node 110 further may indicate the specific size, of the consecutive equally sized packet data units 221, 222, 223, using a second length indicator parameter field, of the packet header 210. The specific size may be indicated as a value in the range 1 to N. The packet data unit whose size is indicated may be the first packet data unit 221 in the sequence of consecutive equally sized packet data units 221, 222, 223.

According to some embodiments, the first length indicator may be a previous length indicator and the second length indicator may be a subsequent length indicator. Then, in the scenarios wherein there is no preceding packet data unit 225 of other size than the specific size in the packet payload 220, the second length indicator parameter field may preferably be the second length indicator parameter field 212 of the packet header 210, and the first length indicator may be the first length indicator 211 of the packet header 210. This is however not the case according to some scenarios wherein there may be at least one preceding packet data unit 225 of other size than the specific size of the consecutive equally sized packed data units 221, 222, 223, since at least one preceding length indicator may be required to indicate the size and/or number of the at least one preceding packet data unit 225.

According to some embodiments the first length indicator may be a subsequent length indicator and the second length indicator may be a previous length indicator. Then, in the scenarios wherein there may be no preceding packet data unit 225 of other size than the specific size in the packet payload 220, the first length indicator may preferably be the second length indicator parameter field 212 of the packet header 210, and the second length indicator may be the first length indicator parameter field 211 of the packet header 210. This is however not the case according to some scenarios wherein there may be at least one preceding packet data unit 225 of other size than the specific size of the consecutive equally sized packed data units 221, 222, 223, since at least one preceding length indicator may be required to indicate the size and/or number of the at least one preceding packet data unit 225.

405. Further the first node 110 is adapted to transmit the data packet 200 to the second node 120 over the radio link 130.

The data packet 200 will now be described from the view of the first node 110. To perform the present method steps 401-405 in the first node 110, the data packet 200 in the first node 110 comprises a data packet header 210 and a data packet payload 210 as depicted in FIG. 2. The data packet header 210 comprising at least one length indicator 211, 212, 213, 214, 215 and the data packet payload 220 comprising a number of consecutive packet data units 221, 222, 223 being of the same specific size. The number of the consecutive data units 221, 222, 223 is indicated using a first length indicator of the at least one length indicators 211, 212, 213, 214, 215 in the data packet header 210. The specific size of the consecutive data units 221, 222, 223 may be indicated using a second length indicator of the at least one length indicators 211, 212, 213, 214, 215 in the data packet header 210. The first length indicator may be a previous length indicator and the second length indicator may be a subsequent length indicator or vice versa. A first set of specific reserved values RV of the length indicator may be used to indicate the number of consecutive data units 221, 222, 223 of the same size in the data packet payload 220. A second set of specific reserved values RVm of the length indicator may be used to indicate the number of consecutive data units 221, 222, 223 of the same size in the data packet payload 220, which specific size of the data units may equal an upper size limit N.

FIG. 5 presents the method steps, performed by the second node 120 for reception of information in data packets 200 over the radio link 130 from the first node 110 according to some of the embodiments. Even though, the method description below refers to embodiments where the first node 110 transmits the information, and the second node 120 receives the information, the method is also equally applicable for the embodiments where the second node 120 may transmit the information, and the first node 110 may receive the information, meaning that the second node 120 may be adapted to perform all the steps performed by the first node 110 as described below, and vice versa. The second network node 120 may be a base station or the second network node 120 may be a portable communication device.

501 The second node 120 receives the data packet 200 from the first node 110 over the radio link 130.

502 The second node 120 detects the value of the first length indicator of the incoming packet header 210. The value of the first length indicator indicates the number of consecutive equally sized packet data units 221, 222, 223 in the packet payload 220. In some embodiments, wherein the size of the consecutive equally sized packet data units 221, 222, 223 in the packet payload 220 is unknown to the second node 120, a first set of reserved values RV may be used. These embodiments may require the method step 503 to indicate the size of the consecutive equally sized packet data units 221, 222, 223 in the packet payload 220. In some other embodiments, wherein the specific size of the consecutive equally sized packet data units 221, 222, 223 in the packet payload 220 may be known by the second node 120, a second set of specific reserved values RVm may be used. The specific size may be the maximum size N. In some embodiments it may be required that the second node 120 have knowledge of the specific reserved values RV and RVm of the length indicator, such as knowledge depicted in Table 4, as well as the maximum size N. The maximum size N may be configured for the receiving second node 120 via higher layer signaling, such as e.g. RRC signaling.

503 In some embodiments the second node 120 may detect the value of the second length indicator, if present, of the incoming packet header 210. The second length indicator may indicate the specific size of the consecutive equally sized packet data units 221, 222, 223 in the packet payload 220.

504 The second node 120 reassembles the packet data units 221, 222, 223 of the incoming packet payload 220 using the information of the number of consecutive equally sized packet data units 221, 222, 223 in the packet payload 220. In some embodiments the information of the specific size of the consecutive equally sized packet data units 221, 222, 223 in the packet payload 220 may also be used by the second node 120 when reassembling.

The data packet 200 will now be described from the view of the second node 120. To perform the present method steps 501-504 in the second node 120, the data packet 200 in the second network node 120 is adapted to comprise a data packet header 210 and a data packet payload 220 as depicted in FIG. 2. The data packet header 210 is adapted to comprise at least one length indicator 211, 212, 213, 214, 215. The data packet payload 220 is adapted to comprise a number of consecutive packet data units 221, 222, 223, being of the same specific size. The number of consecutive data units 221, 222, 223 of the same size is indicated using a first length indicator of the at least one length indicators 211, 212, 213, 214, 215 in the data packet header 210. The specific size of the consecutive data units 221, 222, 223 may be indicated using a second length indicator of the at least one length indicators 211, 212, 213, 214, 215 in the data packet header 210. The first length indicator may be a previous length indicator and the second length indicator may be a subsequent length indicator or vice versa. A first set of specific reserved values RV of the length indicator may be used to indicate the number of consecutive data units 221, 222, 223 of the same size in the data packet payload 220. A second set of specific reserved values RVm of the length indicator may be used to indicate the number of consecutive data units 221, 222, 223 of the same size in the data packet payload 220, which specific size of the data units equals an upper size limit N.

Figure 6:
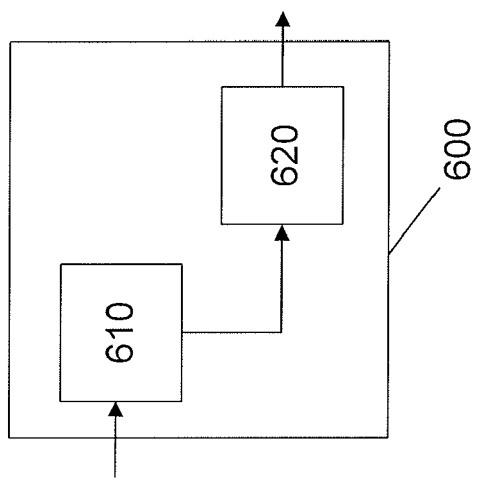
FIG. 6 is a schematic block diagram illustrating an arrangement in a first network node.

To perform the method steps in the first node 110 for transmission of a data packet 200 to a second node 120, the first node 110 comprises an arrangement 600 depicted in FIG. 6. The first network node 110 is adapted to transmit a data packet 200 to a second network node 120 over a radio link 130. The first network node 110 and second network node 120 are comprised in a wireless communications network 100. The data packet 200 comprises a data packet header 210 and a data packet payload 220. The data packet header 210 comprises at least one length indicator 211, 212, 213, 214, 215. The data packet payload 220 comprises a number of consecutive packet data units 221, 222, 223, being of the same specific size.

The first network node arrangement 600 comprises an indication unit 610 adapted to indicate the number of consecutive data units 221, 222, 223 of the same size using a first length indicator of the at least one length indicators 211, 212, 213, 214, 215 in the data packet header 210. The indication unit 610 may further be adapted to indicate the specific size of the consecutive data units 221, 222, 223 using a second length indicator of the at least one length indicators 211, 212, 213, 214, 215 in the data packet header 210.

The first network node arrangement 600 further comprises a transmitting unit 620 adapted to transmit the data packet 200 to the second node 120. In some embodiments the first network node 110 may be a base station. In other embodiments the first network node 110 may be a portable communication device.

Figure 7:
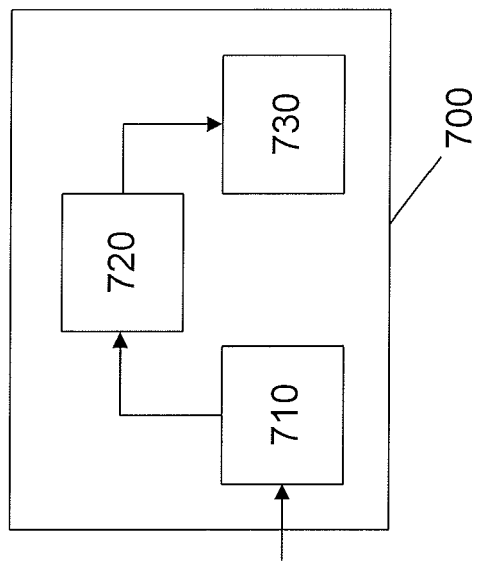
FIG. 7 is a schematic block diagram illustrating an arrangement in a second network node.

To perform the method steps in the second node 120 for reception of a data packet 200 from a first node 110, the second node 120 comprises an arrangement 700 depicted in FIG. 7. The second network node 120 is adapted to receive a data packet 200 from a first network node 110 over a radio link 130. The first network node 110 and second network node 120 are comprised in a wireless communications network 100. The data packet 200 comprises a data packet header 210 and a data packet payload 220. The data packet header 210 comprises at least one length indicator 211, 212, 213, 214, 215. The data packet payload 220 comprises a number of consecutive packet data units 221, 222, 223, being of the same specific size. The second network node arrangement 700 comprises a receiving unit 710 adapted to receive the data packet 200 from the first network node 110.

The second network node arrangement 700 comprises a detection unit 720 adapted to detect a first length indicator of the at least one length indicators 211, 212, 213, 214, 215 in the data packet header 210. The first length indicator of the at least one length indicators 211, 212, 213, 214, 215 indicates the number of consecutive data units 221, 222, 223. The detection unit 720 may further be adapted to detect a second length indicator of the at least one length indicators 211, 212, 213, 214, 215 in the data packet header 210. The second length indicator of the at least one length indicators 211, 212, 213, 214, 215 may indicate the specific size of the consecutive data units 221, 222, 223.

The second network node arrangement 700 comprises a reassembling unit 730 adapted to reassemble the data units 221, 222, 223 using the first length indicator of the at least one length indicators 211, 212, 213, 214, 215 in the data packet header 210. The reassembling unit 730 may further be adapted to reassemble the data units 221, 222, 223 using the second length indicator of the at least one length indicator 211, 212, 213, 214, 215 in the data packet header 210. In some embodiments the second network node 120 may be a base station. In other embodiments the second network node 120 may be a portable communication device.

The present methods and arrangements for improving the performance of a radio access network can be implemented through one or more processors together with computer program code for performing the functions of the invention. The program code mentioned above may also be provided as a computer program product, for instance in the form of a data carrier carrying computer program code for performing the present method when being loaded into the first node 110 and second node 120 of the wireless communications network 100. One such carrier may be in the form of a CD ROM disc. It is however feasible with other data carriers such as a memory stick. The computer program code can furthermore be provided as pure program code on a server and downloaded to the first node 110 and second node 120 remotely.

When using the word "comprise" or "comprising" it shall be interpreted as non-limiting, in the meaning of "consist at least of".

The present invention is not limited to the above-describe preferred embodiments. Various alternatives, modifications and equivalents may be used. Therefore, the above embodiments should not be taken as limiting the scope of the invention, which is defined by the appending claims.

The invention claimed is:

1. A method, performed at a first network node, of transmitting a data packet to a second network node over a radio link in a wireless communications network, the method comprising:
    segmenting a received data packet to include:
        a data packet header having one or more length indicators; and
        a data packet payload having a plurality of variably-sizable packet data units, a number of which are consecutive and of the same size;
    indicating the number of consecutive packet data units that are of the same size in the data payload using a first length indicator in the data packet header; and
    transmitting the data packet to the second network node.

2. The method of claim 1, further comprising indicating the specific size of each of the consecutive packet data units using a second length indicator in the data packet header.

3. The method of claim 1, wherein indicating the number of consecutive packet data units that are of the same size in the data packet payload comprises using a first set of specific reserved values (RV) of the first length indicator to indicate the number of consecutive packet data units in the data packet payload that are the same size.

4. The method of claim 3 wherein a size of the packet data units equals an upper size limit (N), and wherein indicating the number of consecutive data units that are of the same size in the data packet payload comprises using a second set of specific reserved values (RVm) of the first length indicator to indicate the number of consecutive packet data units that are of the same size in the data packet payload.

5. A method, performed at a second network node, of receiving a segmented data packet from a first network node over a radio link in a wireless communications network, the method comprising:
receiving the segmented data packet from the first network node, the data packet including:
a data packet header having one or more length indicators; and
a data packet payload having a plurality of variably-sizable packet data units, a number of which are consecutive and of the same size;
detecting a first length indicator in the data packet header;
determining the number of consecutive packet data units that are of the same size in the data packet payload from information in the first length indicator; and
reassembling the packet data units using the information in the first length indicator in the data packet header.

6. The method of claim 5, further comprising:
detecting a second length indicator in the data packet header;
determining a specific size of the number of consecutive packet data units in the data packet payload from information in the second length indicator; and
wherein reassembling the packet data units further includes using the information in the second length indicator in the data packet header.

7. The method of claim 5, wherein reassembling the data units from information in the first length indicator in the data packet header comprises using a first set of specific reserved values (RV) of the first length indicator to determine the specific size of each of the consecutive packet data units in the data packet payload.

8. The method of claim 7, wherein the specific size of each of the consecutive packet data units equals an upper size limit (N), and further comprising:
detecting a second length indicator in the data packet header; and
determining the number of consecutive packet data units that are in the packet data payload using a second set of specific reserved values (RVm) of the second length indicator.

9. A first network node configured to segment a data packet for transmission to a second network node over a radio link in a wireless communications network to include a data packet header having one or more length indicators, and a data packet payload having a plurality of variably-sizable packet data units, a number of which are consecutive and of the same size, the first network node comprising:
an indicator configured to indicate a number of consecutive packet data units that are of the same size in the packet data payload using a first length indicator in the data packet header; and
a transmitter configured to transmit the data packet to the second node.

10. The first network node of claim 9, wherein the indicator is further configured to indicate a specific size of each of the consecutive packet data units using a second length indicator in the data packet header.

11. The first network node of claim 9, wherein the first network node is a base station.

12. The first network node of claim 9, wherein the first network node is a portable communication device.

13. A second network node configured to receive a segmented data packet from a first network node over a radio link in a wireless communications network, the second network node comprising:
a receiver configured to receive the segmented data packet from the first network node, the segmented data packet including:
a data packet header having one or more length indicators; and
a data packet payload having a plurality of variably-sizable packet data units, a number of which are consecutive and of the same size;
a detection unit configured to detect a first length indicator in the data packet header, and to determine a specific size for each of the consecutive packet data units in the data packet payload from information in the first length indicator; and
a reassembler configured to reassemble the packet data units using the information in the first length indicator.

14. The second network node of claim 13, wherein the detector is further configured to:
detect a second length indicator in the data packet header;
determine a specific size for each of the packet data units in the data packet payload from information in the second length header; and
wherein the reassembler is further configured to reassemble the packet data units using the information in the second length indicator.

15. The second network node of claim 13, wherein the second network node is a base station.

16. The second network node of claim 13, wherein the second network node is a portable communication device.

17. The method of claim 4 further comprising selecting at least one of the first set of specific reserved values (RV) and the second set of reserved values (RVm) from a set of reserved values between N and m.

18. The method of claim 4 further comprising selecting at least one of the first set of specific reserved values (RV) and the second set of reserved values (RVm) from a set of reserved values between N and m+k.

19. The method of claim 4 further comprising generating at least one of the first set of specific reserved values (RV) and the second set of specific reserved values (RVm) from unused spare values of a length indicator in the data packet header.

* * * * *

UNITED STATES PATENT AND TRADEMARK OFFICE
CERTIFICATE OF CORRECTION

PATENT NO.         : 8,345,649 B2                                    Page 1 of 1
APPLICATION NO.    : 12/520384
DATED              : January 1, 2013
INVENTOR(S)        : Larmo et al.

It is certified that error appears in the above-identified patent and that said Letters Patent is hereby corrected as shown below:

On the Title Page, in Item (56), under "OTHER PUBLICATIONS", in Column 2, Line 1, delete "Partnershp" and insert -- Partnership --, therefor.

In the Specification

In Column 1, Line 19, delete "Internet" and insert -- internet --, therefor.

In Column 9, Line 50, delete "payload 210" and insert -- payload 220 --, therefor.

Signed and Sealed this
Thirteenth Day of May, 2014

Michelle K. Lee
*Deputy Director of the United States Patent and Trademark Office*